Oct. 28, 1958     H. E. NATALIS     2,857,787
PLURAL TURRET MACHINE
Filed May 26, 1955     4 Sheets-Sheet 1
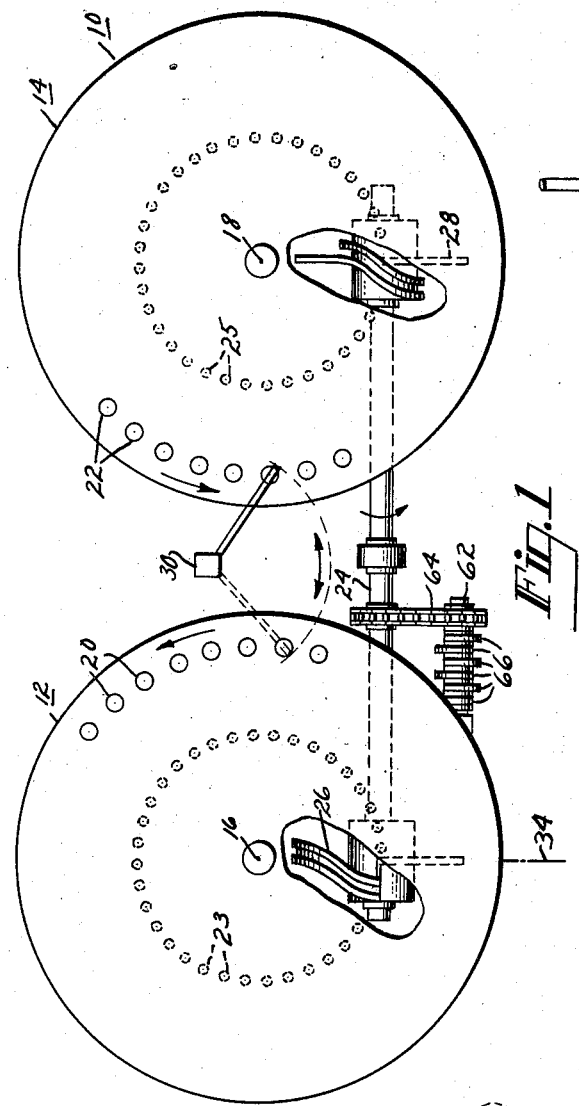
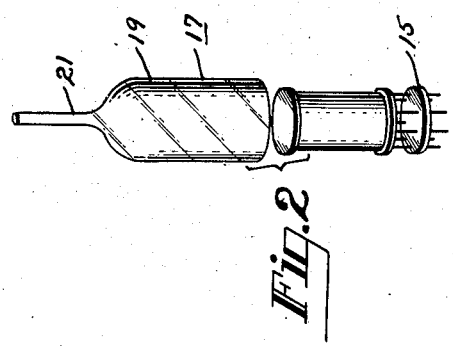
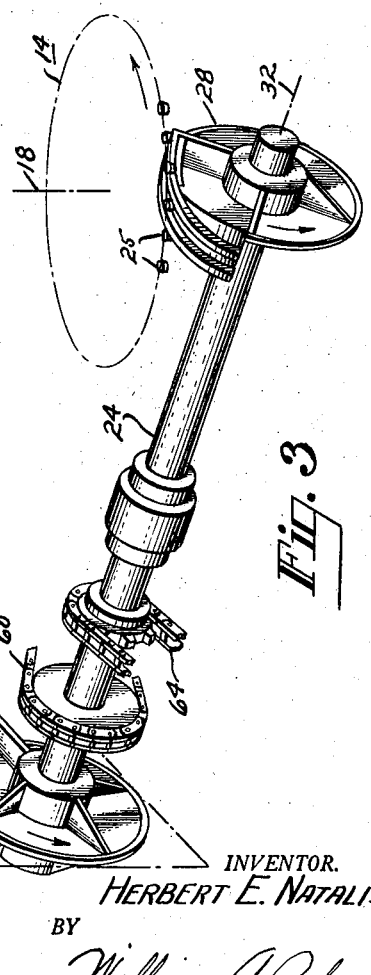
INVENTOR.
HERBERT E. NATALIS
BY
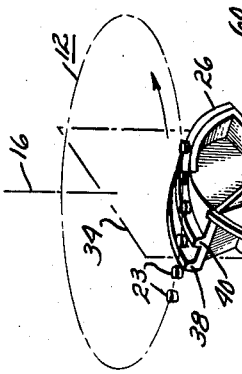
ATTORNEY

INVENTOR.
HERBERT E. NATALIS

Oct. 28, 1958
H. E. NATALIS
2,857,787
PLURAL TURRET MACHINE
Filed May 26, 1955
4 Sheets-Sheet 3
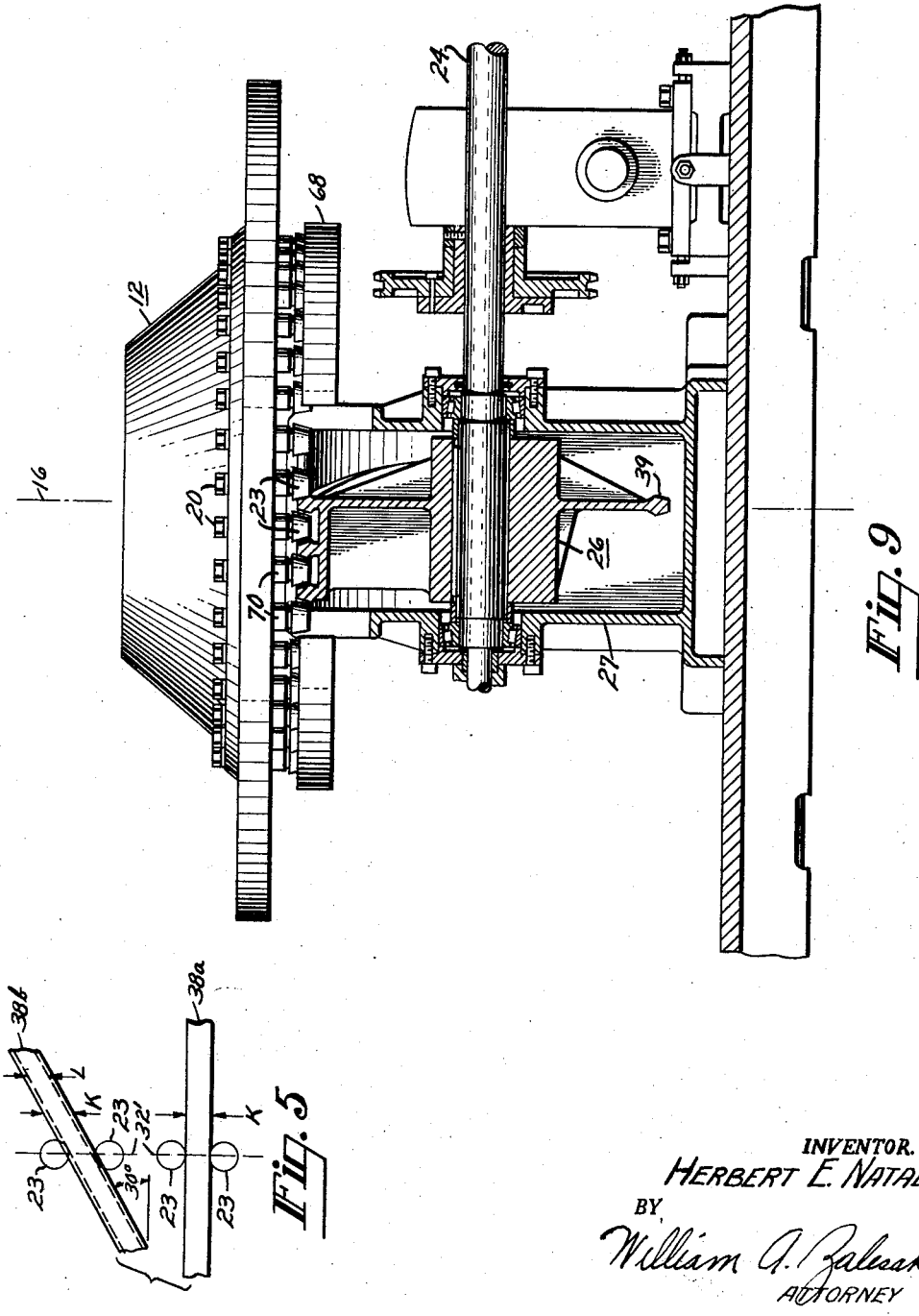
INVENTOR.
HERBERT E. NATALIS
BY
William A. Zalesak
ATTORNEY Oct. 28, 1958 H. E. NATALIS 2,857,787
PLURAL TURRET MACHINE
Filed May 26, 1955 4 Sheets-Sheet 4

INVENTOR.
HERBERT E. NATALIS
BY
William A. Zalesak
ATTORNEY

United States Patent Office 2,857,787
Patented Oct. 28, 1958

2,857,787

PLURAL TURRET MACHINE

Herbert E. Natalis, Rahway, N. J., assignor to Radio Corporation of America, a corporation of Delaware Application May 26, 1955, Serial No. 511,267

15 Claims. (Cl. 74—821)

This invention relates to improvements in plural turret machines of the intermittently actuated variety and, though not limited thereto, is herein described as embodied in a machine for the mass production of electron tubes. One of such machines, for example, includes a pair of side-by-side turrets: one for sealing glass members together to form electron tubes and one for exhausting the tubes to a relatively high vacuum.

Such machines are usually relatively massive structures which must be accelerated and decelerated to bring the successive tubes into the desired positions in order that they be acted upon. If the machines are running at a high production rate the time available for the automatic transfer of the tubes from one turret to the other is limited. Then, too, when the turrets are moved simultaneously a relatively great amount of energy is needed to accelerate and decelerate the relatively massive machines.

Accordingly, it is an object of the invention to reduce the amount of peak power required for a machine having a plurality of relatively massive, simultaneously operating, rotating turrets.

Another purpose of the invention is to provide means for simultaneously, intermittently driving a plurality of turrets with a force which is less than the sum of the forces ordinarily required to drive each of the turrets separately.

It is yet another object of the invention to provide a common drive mechanism for an improved machine having a plurality of asynchronously intermittent, rotating turrets and wherein a portion of the kinetic energy of a turret undergoing deceleration is transferred to another turret undergoing acceleration.

Another aim of the invention is to provide an improved common drive mechanism for intermittently rotating a pair of turrets in asynchronous, overlapping index periods.

A still further object of the invention is to provide an improved cam having a plurality of load bearing members for simultaneously transferring power between each of the members and a cam roller in power transfer relation therewith.

Still another object of the invention is to provide an improved plural turret machine for the automatic and simultaneous sealing and exhausting of electron tubes on separate turrets and in which the time available for transferring electron tubes from the sealing to the exhaust turret is increased.

The invention provides a machine having a plurality of side-by-side turrets asynchronously indexed with respect to each other by a drive mechanism wherein a portion of the kinetic energy of one turret accelerating in one direction is transferred to another turret undergoing a different acceleration, i. e. accelerating at a different rate or decelerating with respect to the frame of reference of the one turret. One plural turret machine embodying the invention includes a pair of electron tube processing turrets, means for transferring an electron tube from one turret at the end of its processing cycle to the other turret, and drive means for intermittently rotating the turrets. The drive means is so connected to the turrets that the accelerating portion of the indexing movement of the first turret coincides with the decelerating portion of the indexing movement of a second turret. Consequently, a portion of the momentum of the second, decelerating turret is utilized to provide part of the force needed to accelerate the first turret. In addition, this arrangement also enables the machine to run at a higher production rate since the tube transfer means picks up a tube from one turret, when the one turret is stationary and the other turret is in motion, and deposits the tube into the other turret when that other turret is stationary and the one turret is again in motion.

Referring now to the appended drawing:

Figure 1 is a partly schematic plan view of a plural turret machine having electron tube sealing and exhaust turrets asynchronously powered by common drive means and including means for transferring a tube from one turret to the other;

Figure 2 is an exploded view in perspective of a tube assembly of a type capable of being processed by the machine of Figure 1;

Figure 3 is a perspective view of the drive means of the plural turret machine of Figure 1;

Figure 5 is a diagram illustrating one of the factors encountered in the design of the cam shown in Figure 4;

Figure 9 is a front elevational view, partly in section, of a portion of the machine of Figure 1.

Figure 4:
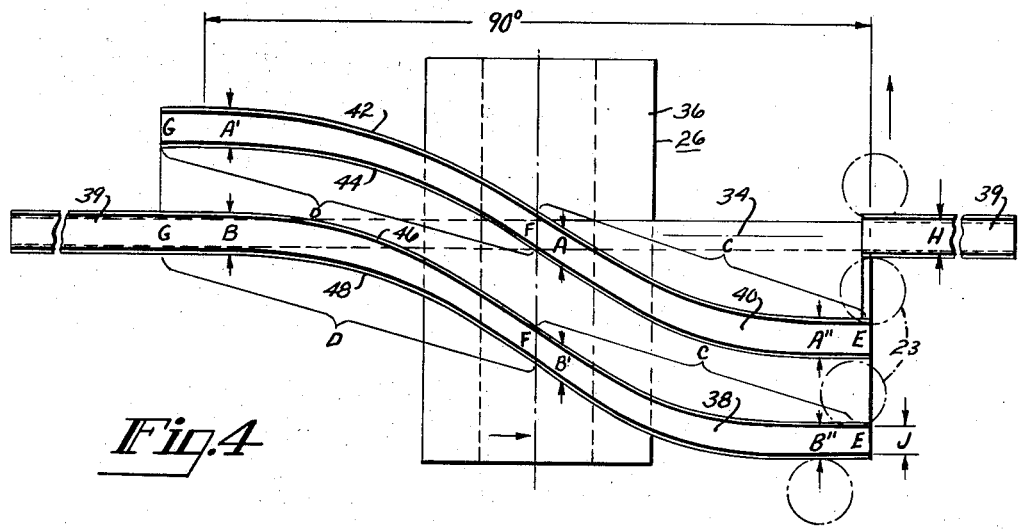
Figure 4 is a side view of one of the cams used in the drive means of Figures 1 and 3.

Referring now to Figure 1, there is shown a partially schematic plan view of a plural turret machine 10 having two turrets 12 and 14. The two turrets 12 and 14 are mounted in spaced apart relationship for rotation about parallel vertical axes 16 and 18 respectively. In one application of the invention, wherein the machine 10 was designed for the production of electron tubes similar to the one shown in Figure 2, the first turret 12 was used in conjunction with conventional sealing apparatus (not shown) for attaching a flat stem 15 of the tube 17 to its cylindrical glass envelope 19 and the second turret 14 was used to exhaust the tubes through their exhaust tubulations 21. To this end each turret is provided with a number (say 36) of workpiece holding portions or heads, indicated schematically by circles 20 and 22, disposed in circumferentially spaced array about its periphery. The sealing and exhaust apparatus may be any of the kind used in the manufacture of evacuated tube assemblies; reference may be made to U. S. Patent No. 2,023,628 granted to V. H. Van Sant for appropriate sealing and exhaust mechanisms.

Intermittent rotary motion is applied to the turrets 12 and 14 by two banks of cam followers in the form of rollers 23 and 25, the rollers of each bank being mounted, respectively, in equally spaced array on the underside of a turret and driven by one of two cams 26 and 28 described below.

The drive mechanism

As shown in Figures 1 and 3, the machine 10 includes a drive mechanism having a drive shaft 24 for intermittently rotating the turrets 12 and 14. The intermittent rotational movements, i. e. indexing movements, move the heads 20 and 22 to successive stations at which different electron tube manufacturing operations are performed. Each indexing movement includes an accelerating portion, where a turret is accelerated from a rest position to a predetermined velocity, and a decelerating portion, where the turret is decelerated from that predetermined velocity back to a next rest position.

The drive shaft 24 is connected to the turrets 12 and 14 by first and second power transfer means in the form of cams 26 and 28, disposed within cam housing 27 (Figure 8) within which a cam lubricant is contained, in a manner described below such that the accelerating portion of each of the indexing movements of the second or exhaust turret 14 coincides with the decelerating portion of the indexing movements of the first or sealing turret 12. Consequently, a portion of the momentum of the second, decelerating turret 14 is utilized to provide part of the force needed to accelerate the first turret 12. This arrangement effects a savings in power requirements in that a decelerative force is utilized to provide an accelerative force.

Figure 7:
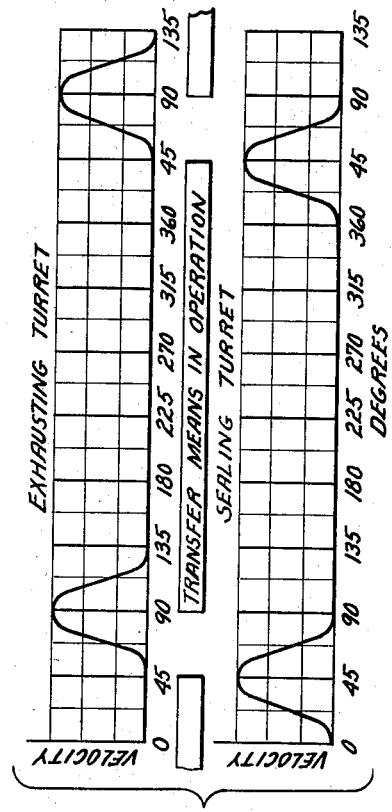
Figure 7 is a chart comparing the velocities of the two asynchronously powered turrets of Figure 1 during one complete cycle of operation of the drive means shown in Figures 1 and 3.

When the sealing turret 12 is indexed in advance of the exhaust turret 14, electron tube assemblies may be picked up from the sealing turret 12, when this turret is stationary and the exhaust turret 14 is in motion, and deposited into the exhaust turret when the exhaust turret is stationary and the sealing turret is in motion. Thus the gain in transfer time amounts to the length of the deceleration period of the exhaust turret 14. If, for example as illustrated in Figure 7, one revolution (360°) of the drive means 24 includes, for each turret, a 45° acceleration period, a 45° deceleration period, and a 270° dwell period, then the transfer time available, indicated by a bar graph 29, extends not only through the 270° dwell period of the exhaust turret 14 but also through the 45° deceleration period thereof preceding this dwell period, the sealing turret 12 being at rest during the deceleration of the exhaust turret. The transfer time, then, extends through a total of 315°, representing a gain of about 20% over the time available when the 270° dwell period alone is used. Transfer means, indicated schematically in Figure 1 by numeral 30, is used to transfer a tube assembly from the sealing turret 12 to the exhaust turret 14. Such transfer means is known in the art and is described, for example, in the aforementioned U. S. Patent 2,023,628.

The turrets of the machine shown in the drawing are each adapted to travel, between two successive rest positions, an arcuate distance corresponding to the distance between two successive stations. However, in order to increase the tube production the machine may be designed as a twin head machine, that is, with two heads being indexed at a time. Thus, each turret, containing thirty-six workpiece holding heads 20 and 22, is rotated 1/18 of a complete revolution during each successive indexing movement. The arcuate distance traveled by each turret between two rest positions represents the distance between three successive stations. When two heads are indexed at a time, a pair of transfer means are used in order to transfer two tube assemblies at a time from the sealing turret 12 to the exhaust turret 14. Each of the transfer means may be of the type indicated by numeral 30 in Figure 1.

One sealing turret 12 used in the manufacture of electron tubes has a weight of about one ton. Its adjacent exhaust turret 14 has a weight of about 1¾ tons. The turrets may be run, for example, at a speed of 1400 indices per hour and, as depicted in Figure 7, for each cycle of operation are each in motion for 90° and at rest for 270°, the various manufacturing operations being performed during the rest period. During its 90° period of motion each turret undergoes an acceleration for 45° of the 90° period of motion, reaching a top speed of about 166 ft. per minute at the periphery of the turret, and then decelerates to a rest position during the next 45°. Since a 360° cycle of the drive means 24 takes a little over two and a half seconds, the time available for acceleration to top speed is less than a half second (namely .32 second), the time available for deceleration also being less than a half second. Since the use of an asynchronous drive allows 315° of a cycle of the drive means to be used for transferring tube assemblies from one turret to the other, over 2.2 seconds are available for the transfer operation. The use of conventional, synchronously operating turrets would have allowed only about 1.9 seconds (270°) which would have been insufficient to perform the transfer operation and would consequently have required that the plural turret machine run at a lower production rate in order to allow the required 2.2 seconds to elapse during each transfer operation.

Figure 8:
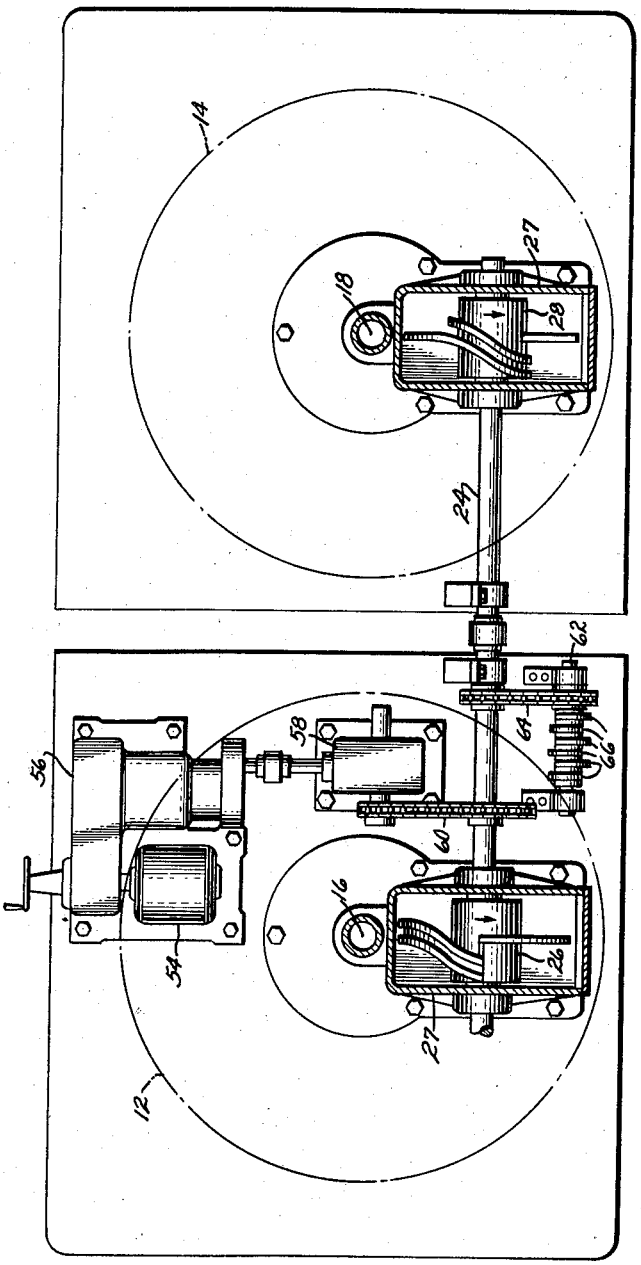
Figure 8 is a view of the plural turret machine of Figure 1 taken through a section below the level of the turrets depicted in the latter figure and omitting the tube transfer means indicated schematically therein.

Referring now to Figure 8 there is shown a motor 54 for rotating the turrets 12 and 14. The motor 54 is connected to a first speed reduction unit 56 which is in turn connected to a second, worm gear speed reduction unit 58, the output of the worm gear unit being connected to the drive shaft 24 by a chain 60. The first speed reduction unit 56 may be any of the type commercially available and is preferably of a variety offering a variable speed output so that the speed of the drive shaft 24 may be adjusted for operation at a maximum speed compatible with the other requirements of the plural turret machine 10.

A second drive shaft 62 is connected to the first drive shaft 24 by means of a second chain 64 and rotates at the same speed as that of the first drive shaft. The second drive shaft 62 has a number of cams 66 fixed to it. The cams 66 are each connected to a cam follower or cam operated valve or switch (not shown) for controlling the operation of the transfer means 30 as well as of the various processing mechanisms (not shown) of the sealing and exhaust turrets.

The power transfer cams

In order that the power transfer cams 26 and 28 are able to handle the relatively high peak loads imposed during the acceleration and deceleration of the turrets 12 and 14, a cam design having a plurality of load bearing members is used. Each of the cams, one of them 26 being shown in detail in Figure 4, has an axis of rotation 32, which is the same axis as that of the drive shaft 24, and a collar 36 having two driving portions or members 38 and 40. Each of the driving members extends about 90° around the circumference of the cam, half of each driving member, or 45°, having a lead increasing from 0° at point E in the drawing to a maximum at point F, and the other half of each driving portion, or 45°, having a lead decreasing from the maximum at point F to 0° at point G. One of the driving members 38 has, extending from it, a dwell member 39 which extends for approximately 270° around the collar 36 and serves to maintain the turret, with which the cam is engaged, at rest for the duration of the travel of the dwell member in engagement with the cam rollers 23. Each of the driving members 38 and 40 has a pair of driving surfaces 42, 44, 46, and 48. Two of the cam rollers 23 are drivably engaged by the cam at all times, the cam rollers being engaged by the portions of the driving surfaces 42, 44, 46, and 48 indicated by letter C during the acceleration of the turret to which the cam rollers 23 are connected, and the portions of the driving surfaces indicated by letter D being driven by the cam rollers during the deceleration of the turret. Since the load on the driving members 38 and 40 of the cam is relatively high, each pair of driving surfaces 42 and 46, and 44 and 48, may have the surfaces thereof out of parallel with each other by an amount of the order of a thousandth of an inch and still have the load divided between the two driving members since each of the driving members is bendable by at least that amount when the full load is put on one of the driving members alone. The driving member subjected to the full load will bend by an amount sufficient to bring the other driving member to bear against the cam roller in registry with it. Thus each cam is adapted to transmit power simultaneously to a plurality of cam rollers.

The axial thickness of each of the driving members 38 and 40 is, along the entire length of the driving surfaces 42, 44, 46, and 48, a constant less an amount which is dependent upon two factors: The first of these factors, a lead angle factor, is concerned only with the angle of lead of the driving members, increasing with increasing lead angles and being zero for a lead angle of 0° or dwell, and is commonly encountered in the design of cams. The decrease in cam driving member thickness due to the second of the factors, a distance factor, which comes into play only when a plurality of driving members are used on a single cam, is determined by the distance of the driving member from a plane 34 (Figures 3 and 4) which passes through the axis of rotation 16 of the turret 12 to which the cam rollers 23 are fixed and which is perpendicular to the cam axis of rotation 32.

Referring now to Figure 5 there are illustrated the circumstances under which the first of the aforementioned factors, the lead angle factor arises. The lines 32' each represent lines parallel to the axis of rotation of a cam having a driving member which has one portion 38a having a lead angle of 0° and another portion 38b having a lead angle of 30°. The portion 38a having a lead angle of 0° has an axial thickness K such that this portion may pass freely between a pair of cam rollers 23. If the portion 38b having a lead angle of 30° were to have the same axial thickness K, this portion 38b would not be able to pass between the cam rollers 23. Consequently, the axial thickness of the second portion 38b must be reduced to that represented in the drawing by L in order to clear the cam rollers 23. Similarly, for lead angles greater than 30° the original axial thickness constant K must be reduced by an amount such that the axial thickness is less than that represented by L; for lead angles of between 0° and 30° the original axial thickness constant K must be reduced by a lesser amount.

Referring to Figure 4, there is illustrated a reduction in axial thickness of the driving members 38 and 40 due to the second of the factors, the distance factor. The reduction in axial thickness of the driving members increases with increasing distances of the driving members from the plane 34 of the dwell member 39. Thus the axial thickness of one driving member 40 taking into consideration for a moment the second factor only, is greatest at the point lettered A (on plane 34) and less at points A' and A''. (Of course, when the first factor, the lead angle one, is also taken into consideration the consideration of both factors will result in A being less than A' or A'' as is shown in the drawing.) Similarly, the axial thickness of the other driving member 38 is greater at point B than at point B', and the axial thickness is less at point B'' than that at point B'. The cam 26, Figures 3 and 8, is mounted at a position on the drive shaft 24 such that a plane 34 containing the dwell member 39 of the cam contains the axis 16 of the turret 12. The axial thickness of the portions of the driving members 38 and 40 which are remote from the plane 34 are reduced by an amount sufficient to compensate for the lesser or foreshortened distance (in a direction perpendicular to plane 34) between adjacent cam rollers at the greater distances from plane 34. For example, distance J (Figure 4) is less than distance H due to the foreshortening of the distance between adjacent cam rollers 23 at positions of the cam rollers remote from plane 34. Consequently, the axial thickness of each of the driving members 38 and 40 is along the entire length of the driving surfaces thereof a constant less an amount, at positions thereof remote from the plane 34, sufficient to compensate for the foreshortening of the distance between adjacent cam rollers 23 at those remote positions. This compensation is of the order of a few hundredths of an inch at points an inch from the plane 34 and, unless made, one of the driving members will be caused to carry the entire load and thus bend beyond its breaking point. Also, failure to allow for the aforementioned foreshortening might cause a driving member to engage two cam rollers simultaneously resulting in a breaking of the cam, the cam rollers, or both.

*The cam rollers*

As shown in Figure 9, each of the cam rollers 23 is fixed to the turret 12 by a cam roller support shaft 70, each of the cam rollers being free to rotate about the shaft 70 on which it is mounted. The cam rollers 23 are tapered so that after having the load bearing surface of the cam worn down they may be lowered toward the cam 26 to compensate for the reduction in cam diameter. The portions of the cam 26 which engage the cam rollers are correspondingly tapered. One set of cam rollers which was used had a taper angle, with respect to the axis of the roller, of 4½°. An oil pan 68 is disposed along the path of travel of the cam rollers 23 and returns to the cam housing 27 lubricant which drips down from the cam rollers.

*The loads imposed on the drive mechanism*

Figure 6:
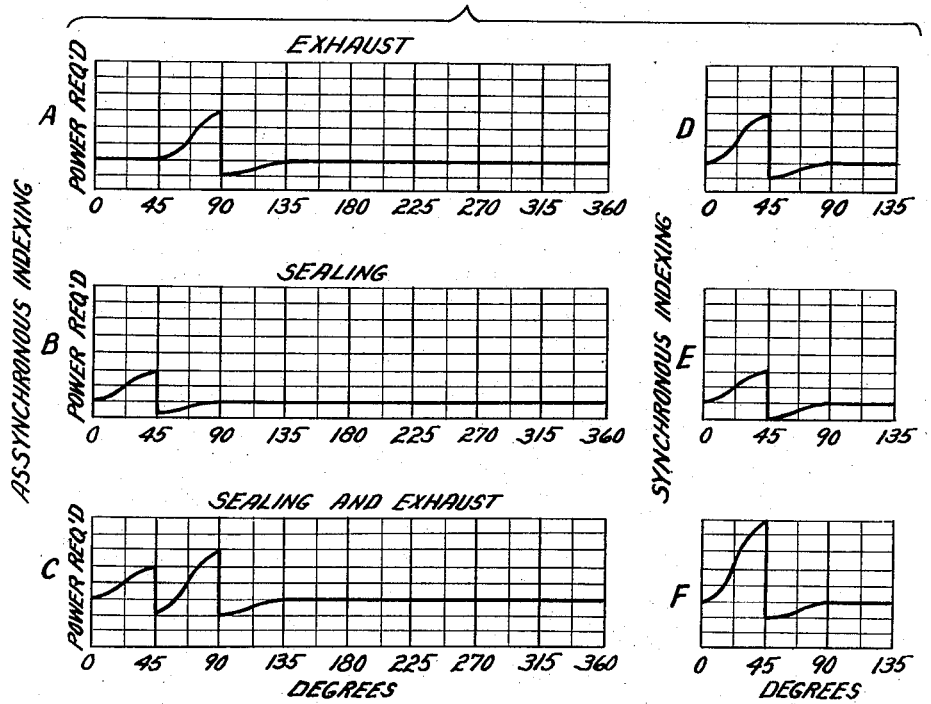
Figure 6 is a chart comparing the power periods of the two asynchronously powered turrets of Figure 1 during one complete cycle of operation of the drive means shown in Figures 1 and 3 and contrasting the power required for the asynchronously powered turrets of Figure 1 with that required for similar turrets synchronously powered.

Figures 6a and 6d are graphs depicting the power requirements of the same exhaust turret under different circumstances, during a 360° cycle of operation of the drive mechanism powering the turret. The power requirements of the exhaust turret asynchronously indexed with respect to a sealing turret are illustrated in Figure 6a and of the exhaust turret synchronously indexed with a sealing turret in Figure 6d. In both cases two units of power are required continuously to make up for friction losses and for powering some of the processing mechanisms of the exhaust turret. At a point designated 45° in Figure 6a the acceleration of the exhaust turret is started, the rate of acceleration being first increased and then decreased until a top speed is attained when the turret has been rotated to the point designated 90° (the velocity being illustrated in Figure 7). At the point 90° the turret undergoes deceleration until it is brought to rest 45° later, at the 135° point (Figure 7). At indicated in Figure 6a the power requirements drop at 90° from a peak of 5 units to 1 unit and then increase to 2 units at 135°, less than 2 units of power being required for the part of the cycle between 90° and 135° since a portion of the stored up energy of the decelerating turret supplies some of the 2 units constant power requirements. Similarly, at the point designated 0° in Figure 6d, the power requirements of the synchronously indexed exhaust turret rise from 2 units to 5 units at top speed (at the point designated 45° in this figure) then drop to 1 unit and finally rise back to the 2 units constant requirement.

In a manner similar to that described with respect to the exhaust turret, an asynchronously indexed sealing turret (Figure 6b) and a synchronously indexed sealing turret (Figure 6e) each have power requirements which rise from a constant of 1 unit of power (the sealing turret having lower constant power requirements since it is lighter) to a peak of 3 units at top speed, down to a half unit at the start of deceleration, and then back to the 1 unit constant requirement.

As compared in Figures 6c and 6f, while the peak power requirements of the asynchronously indexed turrets (Figure 6c) is only 6 units of power since the peak power requirements of the sealing and exhaust turrets have been staggered, the peak power requirements of the synchronously indexed turrets (Figure 6f) is 8 units. Not only does the higher peak power requirement of the synchronously indexed turrets impose a relatively great strain on the power transfer elements, requiring relatively massive power transfer elements with their attendant problems, but the simultaneous deceleration of the two turrets makes for inefficient use of the kinetic energy of the decelerating turrets. A larger portion of the kinetic energy of the simultaneously decelerating turrets is lost in the form of heat than is lost in the asynchronously decelerating turrets.

The invention thus not only provides a means for reducing the peak loads on drive means accelerating and decelerating a plurality of relatively heavy turrets, but also provides an increase in the time during which a workpiece is transferred between different ones of the turrets.

What is claimed is:

1. A turret type machine comprising two spaced turrets, common drive means for said turrets, first power transfer means connected in power transfer relation to one of said turrets and to said drive means, and second power transfer means connected in power transfer relation to the other of said turrets and to said drive means, said drive means having a predetermined cycle of operation, said first and second power transfer means being offset in said cycle of operation to drive one of said turrets in power transfer relation with the other of said turrets and to drive said turrets in overlapping periods of motion and at different accelerations, whereby a portion of the inertial momentum of one of said turrets, through a rotary component of motion, tends upon deceleration to drive the other turret so that the total force required to drive said turrets during said cycle is less than the sum of the forces required to drive said turrets independently.

2. The turret type machine claimed in claim 1, and wherein said first and second power transfer means are constructed to drive said turrets at accelerations in opposite directions during said overlapping periods of motion.

3. A turret type machine, comprising two spaced, intermittently rotatable turrets and common drive means connected to said turrets in overlapping relation for asynchronously intermittently rotating said turrets in overlapping periods, a portion of the acceleration period of one of said turrets coinciding with a portion of the deceleration period of the other of said turrets for transferring power from the decelerating turret to the accelerating turret.

4. A turret type machine, comprising two spaced, rotatable turrets and drive means connected to said turrets in overlapping relation for asynchronously and intermittently rotating said turrets in overlapping periods through an aliquot of a rotation of each of said turrets, said drive means starting the acceleration of one of said turrets while starting the deceleration of the other of said turrets, whereby a portion of the inertial momentum of one of said turrets, through a rotary component of motion, tends upon deceleration to drive the other turret so that the total force required to drive said turrets during said cycle is less than the sum of the forces required to drive said turrets independently.

5. A turret type machine comprising two spaced rotatable turrets each including a plurality of cam rollers having the centers thereof fixed with respect to each other, common drive means for said turrets, two cams each having a plurality of driving members and mounted on said drive means and each cam connected to the cam rollers of one of said turrets in power transfer relation therewith, said drive means having a predetermined cycle of operation, each of said cams having the driving members thereof offset but overlapping with respect to the driving members of the other of said cams for driving said turrets at overlapping periods of motion and at different accelerations, whereby a portion of the inertial momentum of one of said turrets, through a rotary component of motion, tends upon deceleration to drive the other turret so that the total force required to drive said turrets during said cycle is less than the sum of the forces required to drive said turrets independently.

6. A turret type machine comprising two spaced turrets each having an axis of rotation and each including a plurality of cam rollers having the centers thereof fixed with respect to each other; common drive means for said turrets; two cams mounted on said drive means and each cam engageable with the cam rollers of one of said turrets in power transfer relation therewith; each of said cams having an axis of rotation and comprising a collar having a plurality of driving members each including a pair of driving surfaces; the axial thickness of each of said driving members being, along the entire length of the driving surfaces thereof, a constant for a given lead angle thereof less an amount, at portions thereof remote from a plane perpendicular to said cam axis of rotation and containing the axis of the turret with which the cam is in power transfer relation, sufficient to compensate for the foreshortening of the distance between adjacent cam rollers at positions thereof at said remote portions of said driving members.

7. A cam adapted to engage a rotatable member having an axis of rotation and a plurality of cam rollers having the centers thereof fixed with respect to each other; said cam having an axis of rotation and comprising a collar having a plurality of driving members each including a pair of driving surfaces on opposite sides of said driving members; the axial thickness of each of said driving members being, along the entire length of the driving surfaces thereof, a constant for a given lead angle thereof less an amount, at portions thereof adapted to be disposed remote from a plane perpendicular to said cam axis of rotation and containing said axis of said rotatable member, sufficient to compensate for the foreshortening of the distance between adjacent cam rollers at positions thereof at said portions of said driving members.

8. The cam described in claim 7 and wherein said driving members extend outward of said cam axis from said collar.

9. A turret type machine comprising two spaced turrets, common drive means for said turrets, first power transfer means connected in power transfer relation to one of said turrets and to said drive means, and second power transfer means connected in power transfer relation to the other of said turrets and to said drive means, said drive means having a predetermined cycle of operation, said first and second power transfer means being offset in said cycle of operation to drive each of said turrets in power transfer relation with the other of said turrets and to drive said turrets in the same direction and in overlapping periods of motion and at accelerations in opposite directions, whereby the inertial momentum of one of said turrets, through a rotary component of motion, tends upon deceleration to drive the other turret so that the total force required to drive said turrets during said cycle is less than the sum of the forces required to drive said turrets independently.

10. A turret type machine comprising two spaced rotatable turrets each having an axis of rotation and each including a plurality of cam followers having the centers thereof fixed with respect to each other; common drive means for said turrets; two cams each having a plurality of driving members and mounted on said drive means and each cam engageable with the cam followers of one of said turrets in power transfer relation therewith; each of said cams having the driving members thereof offset but overlapping with respect to the driving members of the other of said cams for driving each of said turrets in power transfer relation with the other of said turrets and to drive said turrets in overlapping periods of motion and at different accelerations; each of said cams having an axis of rotation and comprising a plurality of said driving members, each of said driving members including a pair of driving surfaces; the axial thickness of each of said driving members being, along the entire length of the driving surfaces thereof, a constant for a given lead angle thereof less an amount, at portions thereof remote from a plane perpendicular to said cam axis of rotation and containing the axis of the turret with which the cam is in power transfer relation, sufficient to compensate for the foreshortening of the distance between adjacent cam followers at positions thereof at said remote portions of said driving members.

11. A cam structure adapted to engage a rotatable member having an axis of rotation and a plurality of cam followers having the centers thereof fixed with respect to each other; said structure having an axis of rotation and comprising a plurality of driving portions each including a pair of driving surfaces, each pair of surfaces defining, respectively, opposite sides of one driving portion; the axial thickness of each of said driving portions being, along the enitre length of the driving surfaces thereof, a constant for a given lead angle thereof less than an amount, at regions thereof adapted to be disposed remote from a plane perpendicular to said cam structure axis of rotation and containing said axis of said rotatable member, sufficient to compensate for the foreshortening of the distance between adjacent cam followers at positions thereof at said regions of said driving portions.

12. A cam structure adapted to engage a rotatable member having an axis of rotation and a plurality of cam followers having the centers thereof fixed with respect to each other; said structure having an axis of rotation and comprising a plurality of driving portions each including a pair of driving surfaces, each pair of surfaces defining opposite sides of one driving portion; the axial thickness of each of said driving portions being, along the entire length of the driving surfaces thereof, a constant for a given lead angle thereof less an amount, at regions thereof adapted to be disposed remote from a plane perpendicular to said cam structure axis of rotation and containing said axis of said rotatable member, sufficient to compensate for the foreshortening of the distance between adjacent cam followers at positions thereof at said regions of said driving portions; the distance between adjacent portions of the surface of each pair being greater at the surface portions adjacent to said cam structure axis than at the surface portions remote from said cam structure axis, thereby providing said structure with tapered driving portions.

13. A cam structure having an axis of rotation and comprising first and second driving members, said first driving member extending through an arc of 360° about said axis of rotation and including a dwell portion and a lead portion, said lead portion extending through a smaller arc than said dwell portion, said second driving member being spaced from said first driving member along said axis, and comprising a lead portion having the same pitch as the first named lead portion and coextensive therewith, said second driving member extending through an arc of less than 360° about said axis, said first driving member being adapted to engage continuously one of a plurality of cam followers angularly and equidistantly spaced around a common axis of rotation normal to said first named axis during rotation of said cam structure through 360°, and said second driving member being adapted to engage another of said cam followers substantially only when said first named lead portion engages said one of said cam followers, whereby said cam structure is ruggedized at the lead portion thereof for moving a relatively heavy load.

14. A cam structure rotatable on a predetermined axis and including a curvilinear lead portion adapted to engage simultaneously a plurality of cam followers rotatable on a common axis normal to said predetermined axis and equidistantly spaced in an arcuate array centered at said common axis, said cam structure having a curvilinear dwell portion disposed along a radius of said array, said lead portion comprising first and second curvilinear driving members spaced along said predetermined axis and extending across radii of said array, said first member being closer to a plane including said common axis and normal to said predetermined axis than said second member, whereby the spaces between successive ones of said cam followers aligned with said dwell portion, said first driving member and said second driving member are reduced along said predetermined axis, said dwell portion, said first driving member and said second driving member having progressively reduced dimensions along said predetermined axis for snugly entering said spaces.

15. The method of supplying motion to apparatus including a first turret, a second turret, and drive coupling means engageable and disengageable between said turrets, said method comprising rotating said first turret only, to give it kinetic energy, engaging said drive coupling means between said turrets to transfer at least a part of said kinetic energy of said first turret to said second turret to accelerate said second turret in rotation from rest and to decelerate said first turret toward rest, disengaging said drive coupling means between said turrets so that said second turret is free to continue rotation while said first turret is held at rest, engaging said drive coupling means to transfer at least a part of the kinetic energy of said rotating second turret to said stationary first turret to accelerate said first turret in rotation from rest and to decelerate said second turret toward rest, and disengaging said drive coupling means so that said first turret is free to continue rotation while said second turret is held at rest.

References Cited in the file of this patent

UNITED STATES PATENTS

| 215,810 | Eaton | May 27, 1879 |
| 2,427,712 | Casler | Sept. 23, 1947 |